US012698166B2

(12) United States Patent (10) Patent No.: US 12,698,166 B2
Herrmann et al. (45) Date of Patent: Aug. 4, 2026

(54) RECEIVER FOR A VACUUM CONVEYANCE SYSTEM

(71) Applicant: Rheo Engineering, Peoria, IL (US)

(72) Inventors: Andrew Herrmann, Princeville, IL (US); Robert John Nogaj, Jr., Washington, IL (US); Robert Herrmann, Princeville, IL (US)

(73) Assignee: Rheo Engineering, Peoria, IL (US)

( * ) Notice: Subject to any disclaimer, the term of this patent is extended or adjusted under 35 U.S.C. 154(b) by 165 days.

(21) Appl. No.: 18/420,500

(22) Filed: Jan. 23, 2024

(65) Prior Publication Data

US 2024/0246778 A1 Jul. 25, 2024

Related U.S. Application Data

(60) Provisional application No. 63/481,104, filed on Jan. 23, 2023.

(51) Int. Cl.
B65G 53/26 (2006.01)
B65G 51/08 (2006.01)
B65G 51/30 (2006.01)
(52) U.S. Cl.
CPC .............. B65G 51/30 (2013.01); B65G 51/08 (2013.01)
(58) Field of Classification Search
CPC .............. B65G 53/24–26; B65G 53/60; B01D 46/02–023
USPC ................................................. 406/171–172
See application file for complete search history.

(56) References Cited

U.S. PATENT DOCUMENTS

| | | | | | |
|---|---|---|---|---|---|
| 1,564,980 | A | * | 12/1925 | Singer .................... | B65G 53/30 |
| | | | | | 414/217 |
| 2,564,969 | A | * | 8/1951 | Goldberg .................. | B65B 1/28 |
| | | | | | 53/434 |
| 3,169,038 | A | * | 2/1965 | Pendleton .............. | B65G 53/60 |
| | | | | | 55/468 |
| 3,737,074 | A | * | 6/1973 | Davies ................... | B65G 53/66 |
| | | | | | 406/171 |
| 3,765,152 | A | * | 10/1973 | Pausch ............... | B01D 46/4281 |
| | | | | | 95/279 |
| 3,844,750 | A | * | 10/1974 | Ray ........................ | B01D 46/02 |
| | | | | | 55/379 |
| 3,896,984 | A | * | 7/1975 | Edwards .............. | B65G 53/526 |
| | | | | | 241/5 |
| 3,942,561 | A | * | 3/1976 | Stoeffler ................... | B65B 1/16 |
| | | | | | 141/378 |
| 4,005,908 | A | * | 2/1977 | Freeman ................ | B65G 53/28 |
| | | | | | 55/482 |

(Continued)

*Primary Examiner* — Joseph A Dillon, Jr.
(74) *Attorney, Agent, or Firm* — Thomas J. Oppold; Larkin Hoffman Daly & Lindgren, Ltd.

(57) ABSTRACT

A receiver for a vacuum conveyance system may include a vertically-oriented, cylindrical receiver body having an inlet port through which material may be conveyed when an airstream is created. A head assembly attached to an upper end of the receiver body includes a filter housing having a first end and a second end, the filter housing constructed to house a horizontally-oriented cylindrical pre-filter between the first end and the second end, wherein the head assembly includes a filter access cap removably attached to the first end and usable to remove and insert cylindrical pre-filters. A vacuum utility assembly may be attached to the second end of the filter housing.

12 Claims, 6 Drawing Sheets

(56) References Cited

U.S. PATENT DOCUMENTS

| | | | | |
|---|---|---|---|---|
| 4,013,321 A | * | 3/1977 | Pendleton | B65G 53/60 406/171 |
| 4,073,632 A | * | 2/1978 | Reinauer | B01D 46/71 55/374 |
| 4,085,975 A | * | 4/1978 | Bilkvist | B65G 53/28 406/171 |
| 4,235,563 A | * | 11/1980 | Hine | B65G 53/60 406/33 |
| 4,292,057 A | * | 9/1981 | Ulvestad | B01D 46/0005 55/377 |
| 4,312,608 A | * | 1/1982 | Nakhle | B65G 53/64 406/171 |
| 4,351,373 A | * | 9/1982 | Mechalas | B07B 9/00 141/89 |
| 4,662,800 A | * | 5/1987 | Anderson | B65G 65/32 210/402 |
| 4,834,586 A | * | 5/1989 | Depew | B65G 53/60 406/173 |
| 4,889,452 A | * | 12/1989 | Heyl | B65G 53/66 406/122 |
| 5,006,018 A | * | 4/1991 | Depew | B65G 53/24 406/173 |
| 5,033,914 A | * | 7/1991 | Wuertele | B65G 53/28 222/61 |
| 5,088,860 A | * | 2/1992 | Stockdale | A47L 5/14 406/171 |
| 5,139,370 A | * | 8/1992 | Sazzarrini | B01D 46/0004 406/171 |
| 5,163,786 A | * | 11/1992 | Christianson | B65G 53/60 55/467 |
| 5,252,008 A | * | 10/1993 | May, III | B65G 53/66 406/173 |
| 5,785,464 A | * | 7/1998 | May, III | B29C 31/02 406/171 |
| 6,039,513 A | * | 3/2000 | Law | B65G 53/60 406/171 |
| 6,325,572 B1 | * | 12/2001 | Dietrich | B65G 53/60 406/146 |
| 6,358,292 B1 | * | 3/2002 | Clements | B01D 46/521 55/501 |
| 6,604,694 B1 | * | 8/2003 | Kordas | B01D 46/04 239/398 |
| 6,890,129 B2 | * | 5/2005 | Fabbri | B01D 29/86 406/146 |
| 8,157,483 B2 | * | 4/2012 | Volkmann | B65G 53/60 406/134 |
| 8,157,484 B2 | * | 4/2012 | Dietrich | F04F 1/02 406/146 |
| 8,430,230 B1 | * | 4/2013 | Ferguson | B29C 31/02 406/28 |
| 8,580,004 B1 | * | 11/2013 | Clements | B01D 46/521 55/378 |
| 8,662,797 B2 | * | 3/2014 | Ruggero | B01D 46/72 406/121 |
| 8,882,401 B2 | * | 11/2014 | Kinoshita | B65G 53/40 406/106 |
| 9,187,267 B2 | * | 11/2015 | Abramov | B65G 53/26 |
| 2015/0344242 A1 | * | 12/2015 | Celella | B65G 65/40 406/10 |
| 2017/0304511 A1 | * | 10/2017 | Harpham | A61M 1/604 |
| 2018/0327999 A1 | * | 11/2018 | Bural | E02F 3/8816 |
| 2019/0084780 A1 | * | 3/2019 | Maguire | B65G 53/24 |
| 2023/0271127 A1 | * | 8/2023 | Hunzeker | B01D 46/24 406/197 |

* cited by examiner

RECEIVER FOR A VACUUM CONVEYANCE SYSTEM

RELATED APPLICATIONS

This application claims priority to U.S. Provisional Application Ser. No. 63/481,104 filed Jan. 23, 2023, entitled RECEIVER FOR A VACUUM CONVEYANCE SYSTEM.

BACKGROUND OF THE INVENTION

A Vacuum Conveyance System (VCS) (sometimes referred to as a "Pneumatic Transfer System") is a material transfer system that is designed to move powder or other small solids in a highly contained manner. These systems are especially useful when transferring materials that are dangerous, including materials that are toxic, explosive, corrosive, etc. These systems usually include a feed hopper containing material. The feed hopper has a transfer valve at its bottom that leads into a transfer line that has air flowing through it due to a vacuum being pulled on the line. The transfer line carries material to a vacuum receiver that separates the material from the airstream. The material then drops into a receiving hopper while the air is exhausted out of the top of the vacuum receiver.

Typical vacuum receivers are vertical tubes that rise up from the top of the receiving hopper. The tubes may have two ports, one connects to a vacuum line while the other connects to the transfer line. Inside the tube is a filter that prevents the incoming product from being sucked into the vacuum line. During operation, steps are taken, such as cycling the vacuum on and off or undergoing a blow-off procedure, such that material accumulating on the filter falls down into the receiving hopper in the absence of the vacuum.

The filters are cylindrical filters that typically occupy a significant portion of the receiver body. These filters require periodic cleaning and/or replacement. Typical vertical receiver bodies have a filter access cap at the top of the vertical tube that allows an operator to lift the cylindrical filter out of the tube. Depending on the size of the receiver and the space in which the system is located, this vertical filter configuration can present problems as a significant amount of space must be available above the system in order to lift the filter out of the receiver body.

OBJECTS AND SUMMARY OF THE INVENTION

The present invention is directed to a VCS design that utilizes a space-saving horizontal filter configuration that makes accessing the filter for cleaning or replacing significantly more convenient than vertical filter configurations. The horizontal configuration also relocates the filter from within the vertical receiver body to a location above the receiver body, thus reducing the amount of product that accumulates on the filter during use. By relocating the filter horizontally above the receiver, the effective volume of the receiver increases. This corresponds to an increased product flow rate and a decrease in the required off-cycle interval during material transfer.

BRIEF DESCRIPTION OF THE DRAWINGS

These and other aspects, features, and advantages of which embodiments of the invention are capable of will be apparent and elucidated from the following description of embodiments of the present invention, reference being made to the accompanying drawings, in which.

DESCRIPTION OF EMBODIMENTS

Figure 1:
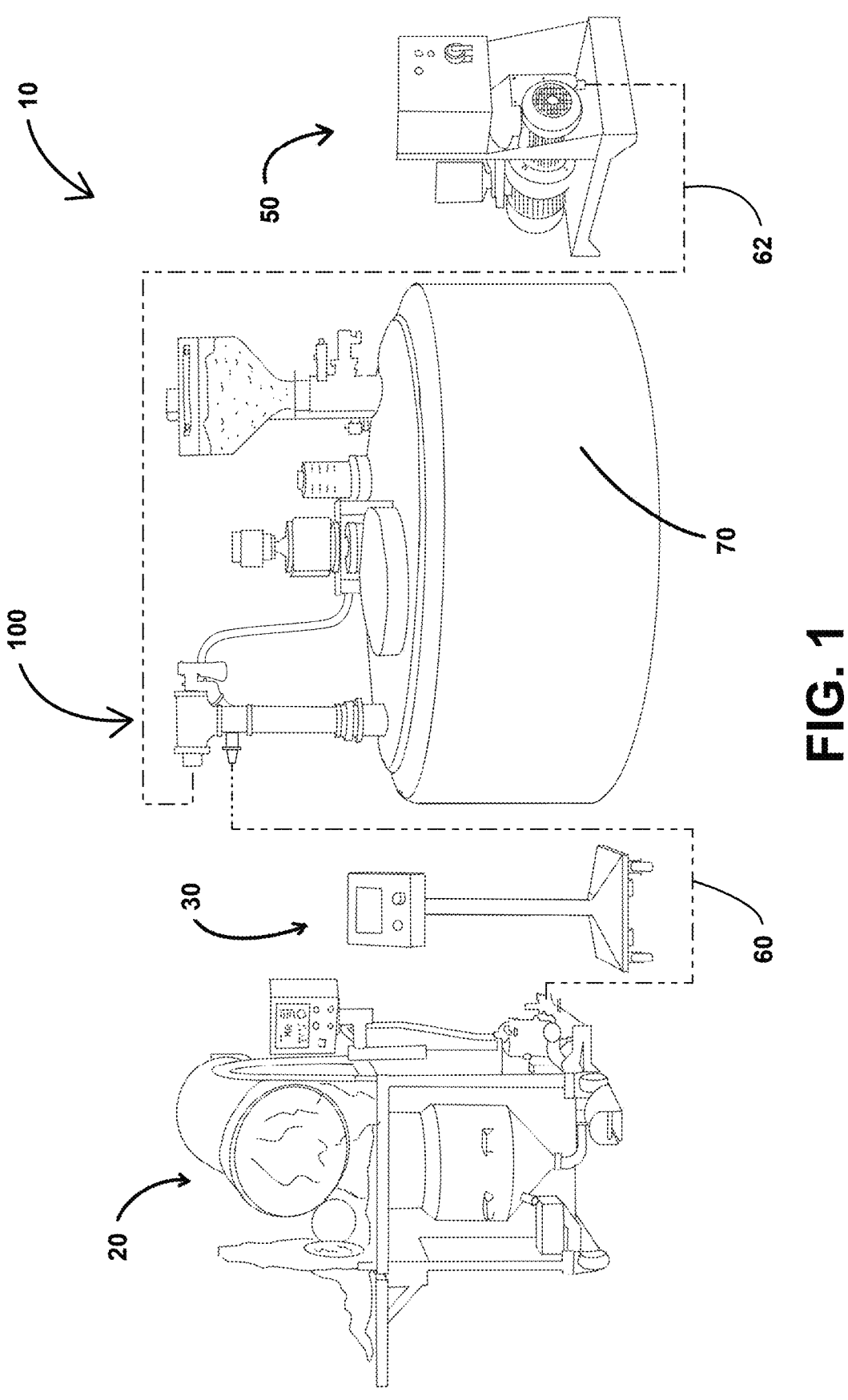
FIG. 1 is a perspective view of vacuum conveyance system including an embodiment of a vacuum receiver according to the invention.

Specific embodiments of the invention will now be described with reference to the accompanying drawings. This invention may however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Referring now to FIG. 1, there is shown a VCS 10 using an embodiment of a vacuum receiver 100 of the invention. The VCS 10 generally includes a material source 20, a control panel 30, a receiver 100 and a vacuum pump 50. A transfer line 60 connects the material source 20 to the receiver 100 and a separate vacuum utility line 62 connects the receiver 100 to the vacuum pump 50. The receiver 100 extends vertically from a large receiving vessel 70. This is just one embodiment of a VCS, and it is provided to give context to the vacuum receiver 100 discussed below.

Figure 2:
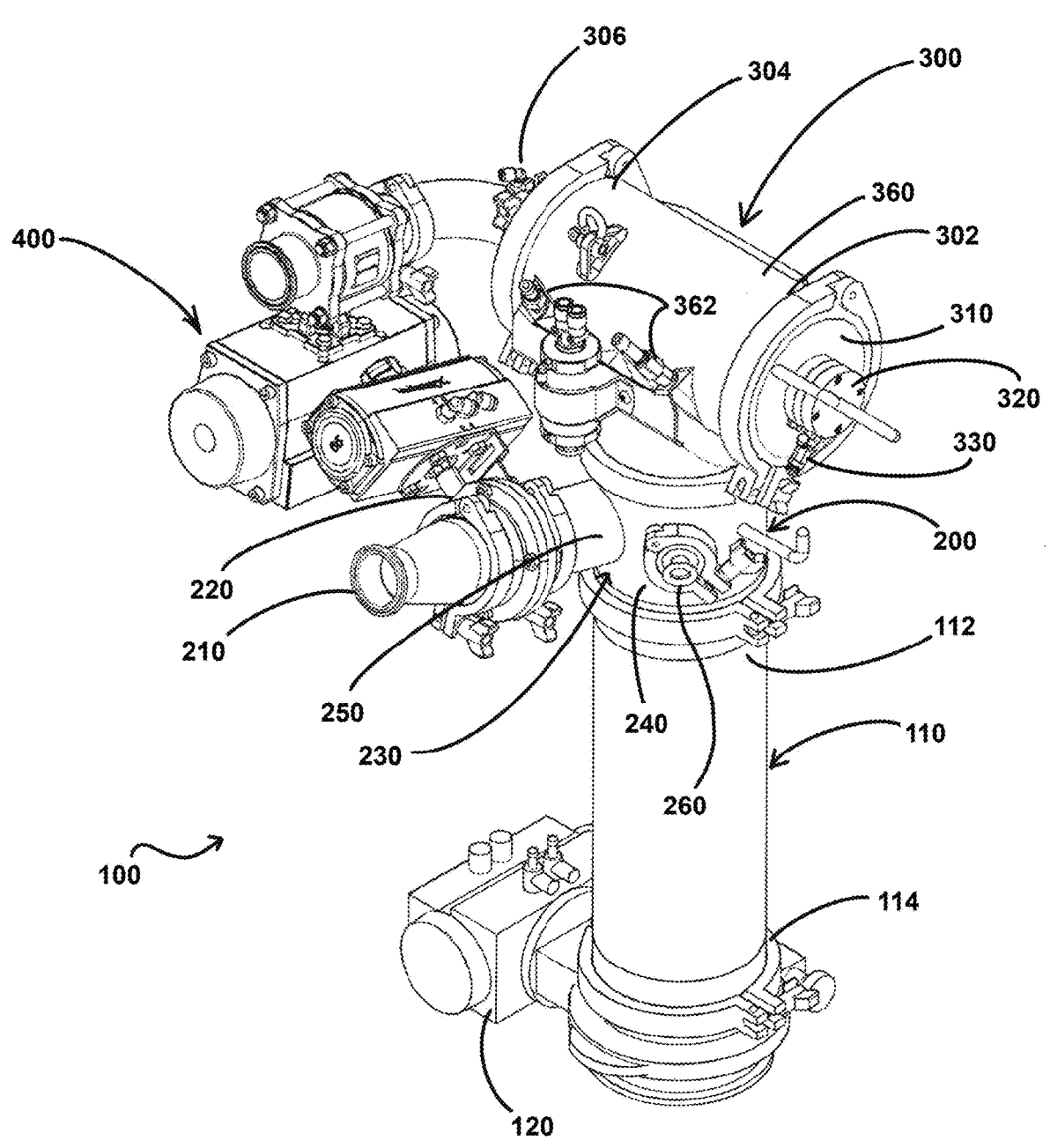
FIG. 2 is a perspective view of an embodiment of a vacuum receiver according to the invention.

FIG. 2 shows an embodiment of a vacuum receiver 100 according to the invention. The vacuum receiver 100 generally includes a receiver body assembly 110, an inlet manifold assembly 200 a head assembly 300 and a vacuum utility assembly 400.

The receiver body assembly 110 is a cylinder connected at a top end 112 to the inlet manifold assembly 200 and has an outlet valve 120 at a bottom end 114. The receiver body assembly 110 has an open interior with smooth walls and is free from obstructions, allowing efficient gravity-fed flow into the large receiving vessel 70 (FIG. 1) when the outlet valve 120 is open, the vacuum utility assembly 400 valve is closed, and the product inlet valve 220 is closed. Gravity-fed flow may be further enhanced through the use of a flow aid, such as a pneumatic vibrator, in order to prevent fine materials from clinging or clumping to interior surfaces of the receiver body assembly 110.

The inlet manifold assembly 200 includes a product inlet 210 that is connectable to the transfer line 60 (FIG. 1) providing the material. The product inlet 210 leads to a product inlet valve 220 which selectively provides access to an inlet manifold 230. The inlet manifold 230 includes a vertical manifold body 240 that is connected to the receiver body assembly 110, and an inlet tube 250 branching off from the vertical manifold body 240 that supports the product inlet valve 220 and feeds material from the product inlet valve 220 to the vertical manifold body 240. The inlet tube 250 may be angled downward as it connects to the vertical manifold body 240 such that product flow is directed downward, away from a pre-filter (discussed below) that is housed within the head assembly 300. The vertical manifold body 240 may also include a utility port 260.

On top of the inlet manifold assembly 200 is a head assembly 300. The head assembly 300 includes a filter housing 360 that is horizontally situated above the inlet manifold assembly 200 to form a tee. The filter housing 360 houses a pre-filter 340, shown in FIG. 3. At a first end 302 of the head assembly 300 is a filter access cap 310. At a second end 304 of the head assembly 300 is an air connection 306 to the vacuum utility assembly 400.

Figure 3:
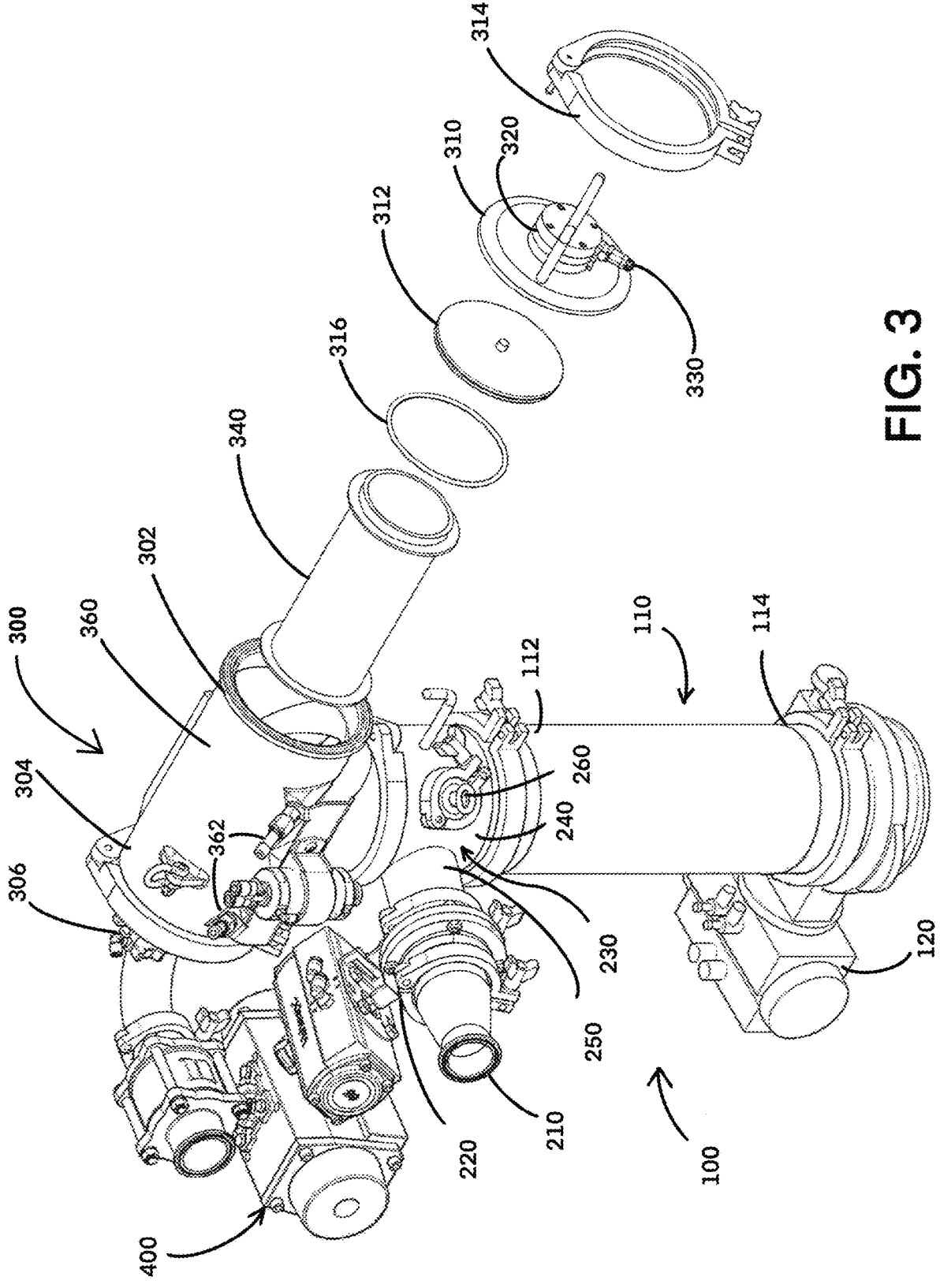
FIG. 3 is a perspective view of an embodiment of a vacuum receiver according to the invention with the head assembly shown in an exploded view to show the contents thereof.

FIG. 3 shows an exploded view of the head assembly 300 with the internal contents separated from the filter housing 360. The filter access cap 310 may include a filter seal actuator 320 and a filter seal actuator quick disconnect fitting 330, which may be in the form of a compressed air connection. The filter access cap 310 is shown as including a sealing puck 312 on its inner side. A sanitary clamp 314 holds the cap 310 onto the filter housing 360 with a gasket 316 ensuring a sealed connection. The filter seal actuator 320 horizontally translates the sealing puck 312 into the pre-filter 340. The pre-filter 340 is pushed against the second end 304 of the filter housing 360, ensuring that air pulled by the vacuum pump 50 (FIG. 1) travels through the sealed pre-filter 340 such that the large amounts of product do not bypass the pre-filter 340 an unnecessarily load an on-board HEPA filter of the vacuum pump 50 (FIG. 1).

For purposes of clarity, the pre-filter 340 is a filter that is referred to herein as a "pre-filter" in order to distinguish it from the standard HEPA filter found in the vacuum pump 50. The pre-filter 340 is, by design, a less efficient filter that allows the VCS 10 to maintain adequate vacuum and flow, while protecting the HEPA filter. Because the HEPA filter is a standard feature of a vacuum pump, and the present invention is directed to the housing and orientation of the pre-filter, features of the invention that relate to the pre-filter, for example the housing, are termed "filter housing" as opposed to "pre-filter housing," and should not be interpreted as pertaining to the HEPA filter of the vacuum pump 50 unless otherwise denoted herein.

Figure 4:
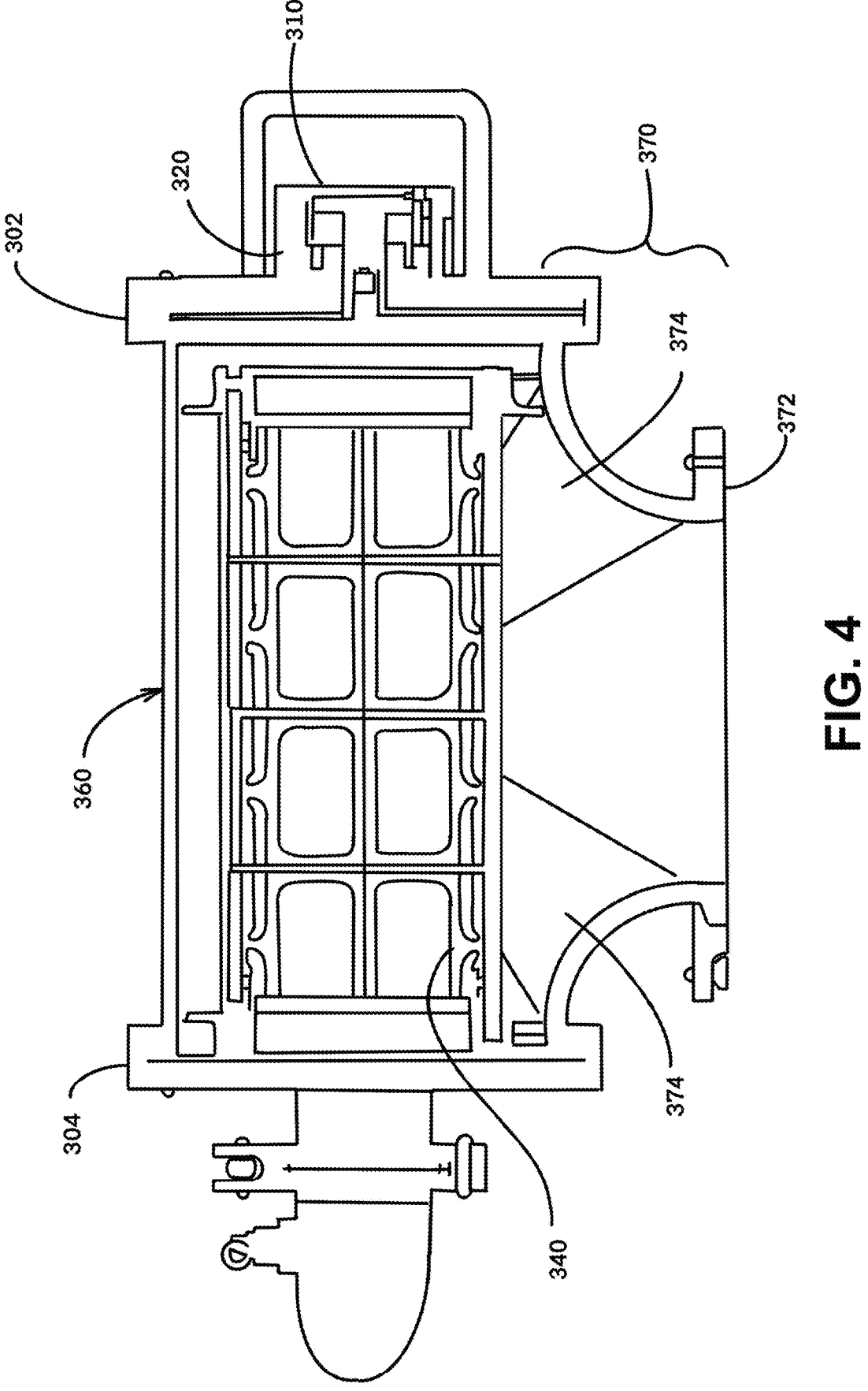
FIG. 4 is a side profile cutaway view of an embodiment of a head assembly according to the invention.
Figure 5:
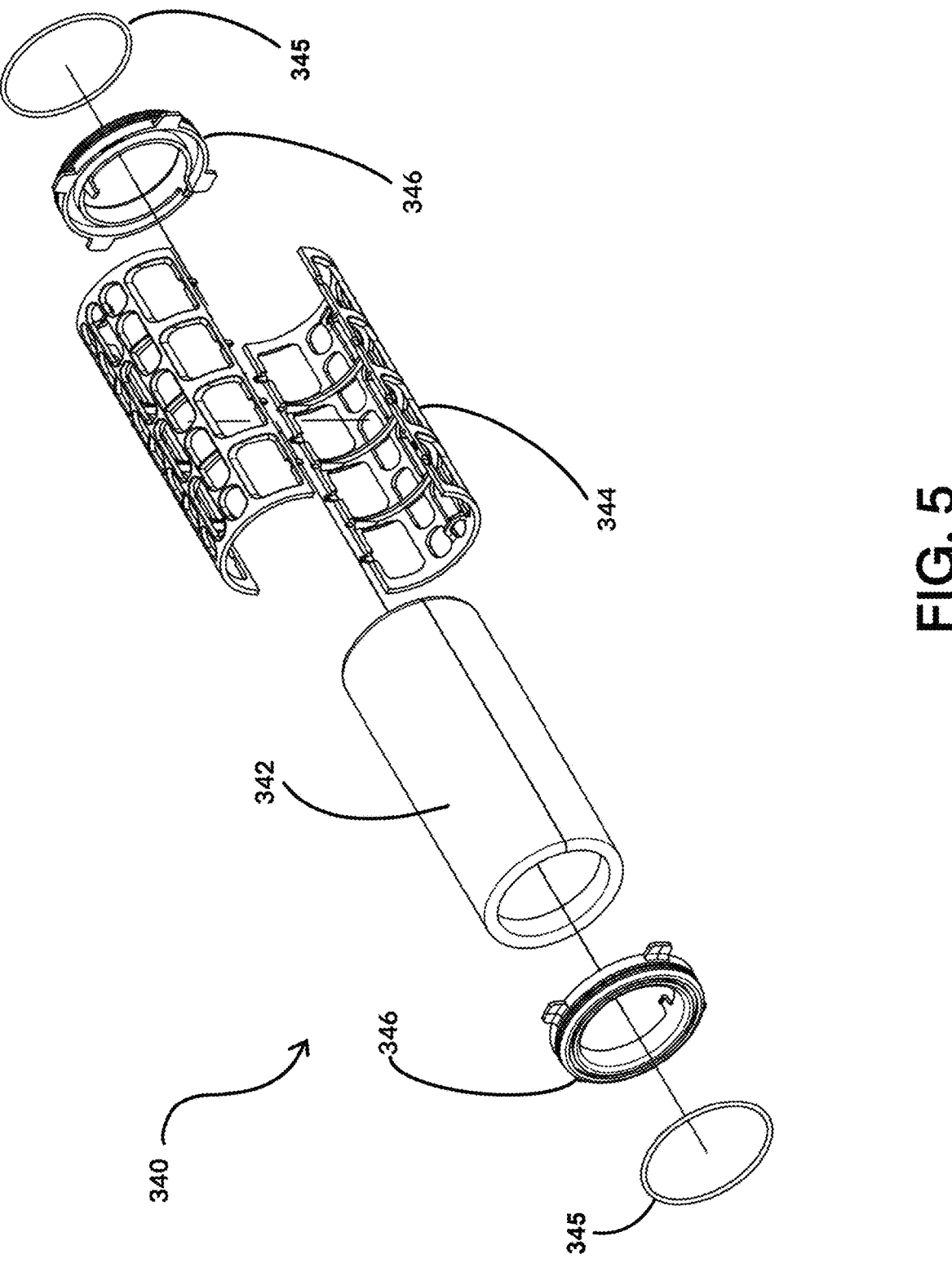
FIG. 5 is an exploded view of an embodiment of a pre-filter according to the invention; and, FIG. 6 is an exploded view of an embodiment of a pre-filter according to the invention.

FIG. 4 is a cutaway view of the head assembly 300 and shows that the head assembly 300 contains a pre-filter 340. FIG. 5 shows an exploded view of the pre-filter 340. The pre-filter 340 includes a fabric filter 342 that surrounds a filter cage 344. The pre-filter 340 further includes an O-ring 345 and an end cap 346 at both ends of the pre-filter 340.

Figure 6:
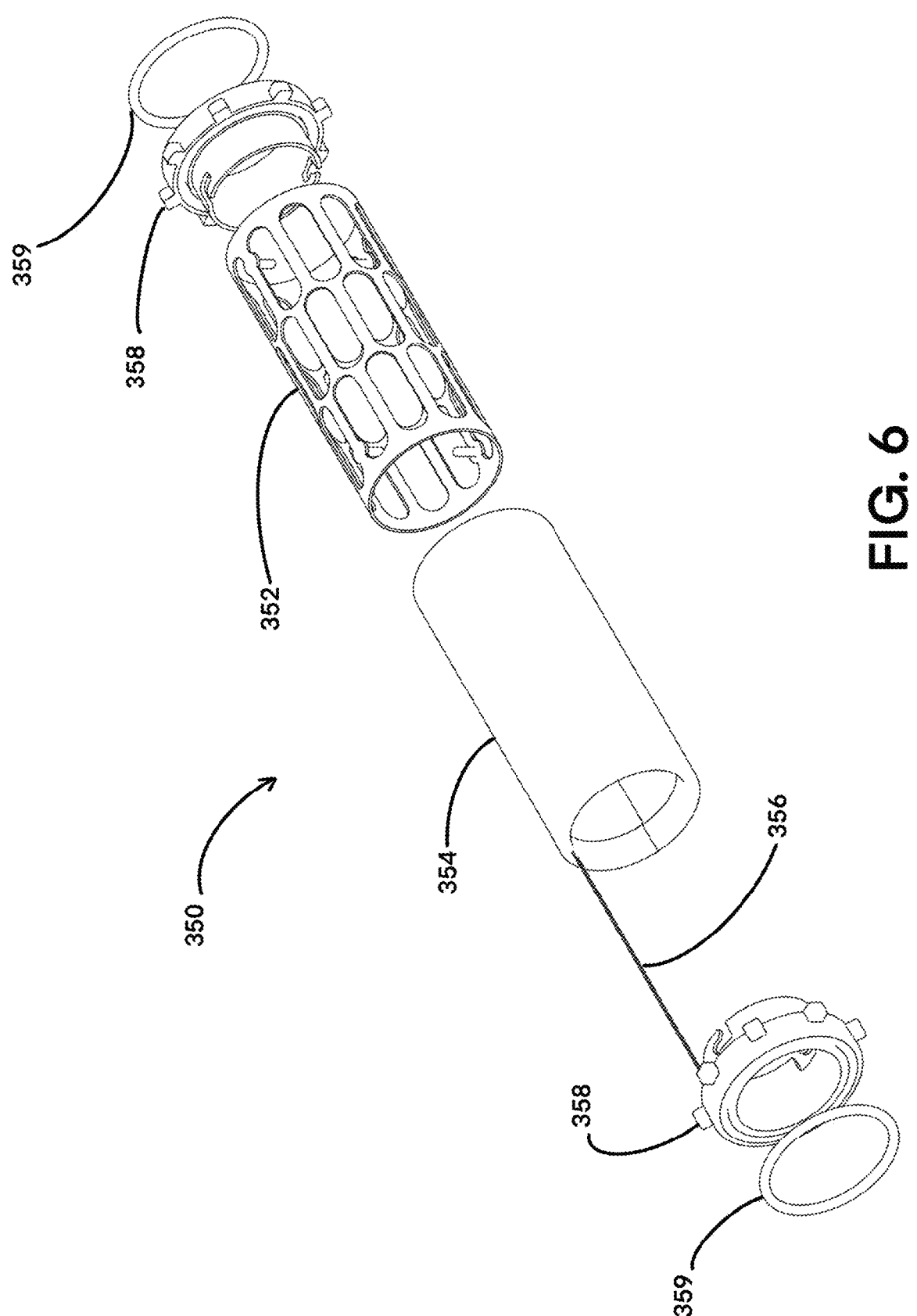

FIG. 6 is an embodiment of a conductive pre-filter 350 that is grounded and bonded to dissipate electrostatic charge for the transfer of low minimum ignition energy materials (MIE). The pre-filter 350 includes an inner filter cage 352 that is surrounded on an outside surface by a static dissipative filter fabric 354 that folds around the ends of the cage and includes a grounding strap 356. Like the pre-filter 340, the pre-filter 350 also has end caps 358 and O-rings 359 at each end.

FIG. 4 further shows that the filter housing 360 has a complex shape. The filter housing 360 is generally a hollow horizontal cylinder with an open interior sized to contain the pre-filter. The open interior includes an opening at the bottom that leads into the inlet manifold assembly 200. In order to provide a smooth material flow between the head assembly 300 and the inlet manifold assembly 200, the filter housing 360 includes a transition section 370, characterized by smooth, curved walls 374 that extend upwardly and outwardly from a vertical cylindrical bottom 372, ending with the horizontal cylindrical walls at the first end 302 and the second end 304.

As best shown in FIGS. 2 and 3, the filter housing 360 may further include wet-in-place (WIP) nozzles 362 that are connectable to a pressurized cleaning solution supply and lead into the interior of the filter housing 360 such that the interior surfaces and pre-filter 340 may be wetted without removing the pre-filter 340. In at least one embodiment, the cleaning effect is maximized by locating the nozzles 362 near the ends 302 and 304 and angling the nozzles 362 toward the filter housing 360 walls, as opposed to directly at the pre-filter 340, and also angling them toward the horizontal, cylindrical portions of the transition section 370, such that the solution shooting out of the nozzles 362 creates a vortex of cleaning solution that encompasses the pre-filter 340 to provide full interior surface area coverage of the filter housing 360. The horizontal orientation of the head assembly 300 optimizes the vortex cleaning action as the solution does not merely cascade down the receiver body assembly 110. If necessary, the utility port 260 may accommodate a retractable spray device for improved coverage in the inlet manifold assembly 200 and receiver body assembly 110.

In operation, the VCS 10 operates under a continuous vacuum that is directed with the opening and closing of the valves by a programmable logic controller (PLC) using operator input as read by the control panel 30. When the vacuum utility assembly 400 is cycled on and the receiver has built a sufficient vacuum, a valve connected to the material source 20 is opened to allow the material to flow through the transfer line 60. The outlet valve 120 is closed so as to prevent material in the large receiving vessel 70 from being drawn into the vacuum receiver 100 and also to prevent a vacuum lag due to the large volume of the receiving vessel 70. The product inlet valve 220 is open to allow the vacuum utility assembly 400 to pull the material through the transfer line 60 into the inlet manifold assembly 200. A majority of the material then collects in the receiver body assembly 110 due to the angle of the inlet tube 250, which causes the airflow to make a sharp upward turn while the material drops down into the receiver body assembly 110. The airflow is sucked upward into the head assembly 300 and through the pre-filter 340, where the rest of the material is removed from the airstream and collects on the outside of the pre-filter 340. The airflow then is pulled through the vacuum utility assembly 400, to the HEPA filter aboard the vacuum pump 50, and is vented to the atmosphere, free of material.

While the vacuum is being drawn, material builds up on the pre-filter 340 at a rate determined by the characteristics of the material being transferred and the filter being used. To dispense the material gathered in the receiver, the vacuum utility assembly 400 valve is closed, and the pre-filter blow-off function is enabled as compressed air is introduced to the interior of the pre-filter 340 via the air connection 306. This flexes the pre-filter 340 and pushes agglomerated material off of the pre-filter fabric 342. The blow-off function also assists in emptying the contents of the receiver body assembly 110 into the large receiving vessel 70 by pushing material downward toward the outlet valve 120. The VCS 10 accomplishes this material transfer by closing the vacuum utility assembly 400 valve, closing the product inlet valve 220, and opening the outlet valve 120. With no vacuum being drawn and the blow-off function active, the material falls into the large receiving vessel 70. After a predetermined interval time, the process is repeated until a desired amount of material is transferred into the large receiving vessel 70.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A vacuum receiver for a vacuum conveyance system, the vacuum receiver comprising:

a receiver body having a lower end and an upper end, the lower end coupled to a receiving vessel, the upper end extending a distance substantially vertically upward relative to the lower end, thereby defining a substantially vertically oriented receiver body, the receiver body including an inlet port;

a head assembly in the form of a tee with a hollow cylindrical portion and a branch portion, the branch portion coupled to the upper end of the receiver body, the cylindrical portion extending substantially horizontally relative to the branch portion, thereby defining a substantially horizontally-oriented filter housing, the filter housing having a first end and a second end, the filter housing sized to receive a pre-filter between the first end and the second end;

wherein the filter housing includes a filter access cap removably attached to the first end for removably inserting the pre-filter into the filter housing;

a vacuum utility assembly connected to the second end of the filter housing.

2. The vacuum receiver of claim 1, wherein the filter access cap includes a filter seal actuator.

3. The vacuum receiver of claim 1, wherein the filter access cap includes a quick disconnect compressed air connection.

4. The vacuum receiver of claim 1, wherein the filter access cap includes a sealing puck.

5. The vacuum receiver of claim 1, wherein the branch portion includes smooth, curved walls that transition upwardly and outwardly toward the hollow cylindrical portion of the filter housing.

6. A vacuum conveyance system, comprising:

a vertically-oriented, substantially cylindrical a receiver body having an upper end and a lower end, the lower end coupled to the receiving vessel, the upper end extending a distance substantially vertically upward relative to the lower end, thereby defining a substantially vertically-oriented receiver body, the receiver body including an inlet port through which material may be conveyed when an airstream is created;

a head assembly and attached to an upper end of the receiver body in the form of a tee with a hollow cylindrical portion and a branch portion, the branch portion coupled to the upper end of the of the receiver body, the cylindrical portion extending substantially horizontally relative to the branch portion, thereby defining a substantially horizontally-oriented filter housing, the filter housing having a first end and a second end, the filter housing including a filter access cap removably attached to the first end of the filter housing;

a vacuum utility assembly connected to the second end of the filter housing;

a pre-filter received within the filter housing between the first end and the second end;

a transfer line connected at one end to the inlet port and at another end to the material source;

a vacuum utility line connected at one end to the vacuum utility assembly and at another end to the vacuum pump.

7. The vacuum conveyance system of claim 6, wherein the pre-filter includes a conductive pre-filter.

8. The vacuum conveyance system of claim 6, wherein the pre-filter includes a filter cage surrounded by a filter fabric.

9. The vacuum conveyance system of claim 6, wherein the pre-filter includes an inner filter cage surrounded by a static dissipative filter fabric.

10. The vacuum conveyance system of claim 6, wherein the filter access cap includes a filter seal actuator.

11. The vacuum conveyance system of claim 6, wherein the filter access cap includes a quick disconnect compressed air connection.

12. The vacuum conveyance system of claim 6, wherein the branch portion incudes smooth, curved walls that transition upwardly and outwardly toward the hollow cylindrical portion of the filter housing.

* * * * *